US009123032B2

(12) United States Patent
Ristock

(10) Patent No.: US 9,123,032 B2
(45) Date of Patent: *Sep. 1, 2015

(54) SYSTEM FOR DETERMINING PRESENCE OF AND AUTHORIZING A QUORUM TO TRANSACT BUSINESS OVER A NETWORK

(71) Applicant: Genesys Telecommunications Laboratories, Inc., Daly City, CA (US)

(72) Inventor: Herbert W. A. Ristock, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,536

(22) Filed: Jan. 21, 2014

(65) Prior Publication Data

US 2014/0136267 A1  May 15, 2014

Related U.S. Application Data

(62) Division of application No. 12/942,328, filed on Nov. 9, 2010, now Pat. No. 8,639,758.

(51) Int. Cl.
*G06F 15/16* (2006.01)
*G06Q 10/10* (2012.01)
(Continued)

(52) U.S. Cl.
CPC ............ *G06Q 10/1097* (2013.01); *G06Q 10/10* (2013.01); *G06Q 10/101* (2013.01); *G06Q 30/06* (2013.01); *H04L 67/24* (2013.01)

(58) Field of Classification Search
CPC ... G06Q 10/101; G06Q 10/1097; H04L 67/24

USPC ......... 709/200–205, 217–227, 228; 705/7.12, 705/7.13, 7.15, 7.18, 7.19
See application file for complete search history.

(56) References Cited

U.S. PATENT DOCUMENTS 6,766,374 B2 * 7/2004 Trovato et al. ................ 709/227
7,151,753 B2 * 12/2006 Chaney et al. ................ 370/261

(Continued)

OTHER PUBLICATIONS

International Preliminary Report on Patentability with Written Opinion for PCT/US2011/058909, issued on May 14, 2013, 5 pages.

(Continued)

*Primary Examiner* — Moustafa M Meky
(74) *Attorney, Agent, or Firm* — Christie, Parker & Hale, LLP

(57) ABSTRACT

A system for determining presence of and authorizing a quorum to transact business over a network includes a first set of machine-readable instructions resident on a digital medium accessible to a computing machine, the instructions causing the machine to monitor a network for active presence of individual ones of communications devices associated with members of an authorized team of individuals from which the quorum may be determined, a second set of machine-readable instructions resident on the medium for causing the computing machine to make a confirmation of the quorum against a set of rules, and to authorize one or more of the individual communications devices making up the quorum to perform one or more tasks based on quorum consensus, and a user configuration, scheduling, and notification application resident on the digital medium for enabling a user to configure, schedule, and notify team members of a pending quorum event.

20 Claims, 6 Drawing Sheets

(51) Int. Cl.
  *G06Q 30/06* (2012.01)
  *H04L 29/08* (2006.01)

(56) References Cited

U.S. PATENT DOCUMENTS

| | | | | |
|---|---|---|---|---|
| 7,184,415 | B2* | 2/2007 | Chaney et al. | 370/260 |
| 7,242,421 | B2* | 7/2007 | Center et al. | 348/14.1 |
| 7,249,280 | B2* | 7/2007 | Lamport et al. | 714/11 |
| 7,558,883 | B1* | 7/2009 | Lamport | 709/248 |
| 7,602,893 | B2* | 10/2009 | Bhatia et al. | 379/202.01 |
| 8,126,992 | B2* | 2/2012 | Andreev et al. | 709/223 |
| 8,270,320 | B2* | 9/2012 | Boyer et al. | 370/260 |
| 8,428,634 | B2* | 4/2013 | Schwagmann et al. | 455/518 |
| 8,639,758 | B2* | 1/2014 | Ristock | 709/205 |
| 8,745,250 | B2* | 6/2014 | Shah et al. | 709/229 |
| 2002/0163572 | A1 | 11/2002 | Center, Jr. et al. | |
| 2003/0108002 | A1* | 6/2003 | Chaney et al. | 370/261 |
| 2004/0001446 | A1* | 1/2004 | Bhatia et al. | 370/261 |
| 2006/0045029 | A1 | 3/2006 | Ethier et al. | |
| 2006/0067250 | A1* | 3/2006 | Boyer et al. | 370/260 |
| 2007/0229652 | A1 | 10/2007 | Center et al. | |
| 2009/0190511 | A1* | 7/2009 | Li et al. | 370/310 |
| 2009/0251285 | A1 | 10/2009 | Do et al. | |
| 2009/0259718 | A1 | 10/2009 | O'Sullivan et al. | |
| 2010/0332668 | A1* | 12/2010 | Shah et al. | 709/229 |
| 2011/0231321 | A1* | 9/2011 | Milne | 705/80 |

OTHER PUBLICATIONS

International Search Report for PCT/US2011/058909, mailed on Mar. 19, 2012, 2 pages.

* cited by examiner

SYSTEM FOR DETERMINING PRESENCE OF AND AUTHORIZING A QUORUM TO TRANSACT BUSINESS OVER A NETWORK

CROSS-REFERENCE TO RELATED APPLICATIONS

This application is a divisional of U.S. patent application Ser. No. 12/942,328 filed on Nov. 9, 2010, the entire content of which is incorporated herein by reference.

BACKGROUND OF THE INVENTION

1. Field of the Invention

The present invention is in the field of ecommerce and pertains particularly to methods and apparatus for determining a quorum based on presence and authorizing one or more quorum members to process an event.

2. Discussion of the State of the Art

In the art of transacting there are often scenarios where access to certain content such as a document, a directory, or a task or process may be granted only if approved by a quorum of authorized persons. One representative use case might be a task given to a team of highly skilled specialists or persons with high confidentiality clearance where during any phase of task processing there has to be at least a minimum number of team members (quorum) directly involved. In another case, a highly protected document might exist that can be opened only if approved by a quorum out of a group of assigned persons.

There are specialized solutions such as Microsoft™ Quorum Authorization for Expenditure, Quorum Joint Interest Billing, Quorum Fixed Assets, and Quorum Contract Management. These solutions are based on voting approval without requiring actual presence in time of quorum members.

Therefore, what is clearly needed is a system and methods for enabling authorization of a quorum to process an event based on presence combined with geo-location or virtual presence attributes.

SUMMARY OF THE INVENTION

The problem stated above is that authorization to perform certain tasks or duties based on consensus of a quorum is desirable for a business that is network-centered and has a board or other body requiring a quorum of individuals to agree to certain items of business, but many of the conventional means for enabling network-based authorization based on consensus by a quorum, such as database applications catering to corporations, do not require actual presence of the quorum lending to potential security problems or internal conflicts and errors. The inventors therefore considered functional components of network-based communications and computing appliances and systems, looking for elements that exhibit interoperability that could potentially be harnessed to provide quorum-based network authorization but in a manner that would not create inconsistencies or ambiguity.

The present inventor realized in an inventive moment that if, at the point of need, a presence-based quorum of authorized individuals could be efficiently determined remotely over a network, significant improvement in transaction efficiency and reliability might result. The inventor therefore constructed a unique system for determining presence of and authorizing a quorum to transact business that allowed the quorum to be recognized through presence information as identified by monitoring status of registered communications devices connected at least to the network. A significant improvement in system efficiency results, with no impediment to workflow or quality of service created.

Accordingly, in one embodiment of the present invention, a system for determining presence of and authorizing a quorum to transact business over a network is provided. The system includes a digital medium accessible to a computing machine, the digital medium having thereon a first set of machine-readable instructions causing the machine to monitor a network for active presence of individual ones of communications devices associated with members of an authorized team of individuals from which the quorum may be identified, a second set of machine-readable instructions residing on the digital medium for causing the computing machine to make a confirmation of the quorum against a pre-configured set of rules, and to authorize one or more of the individual communications devices making up the quorum to perform one or more stated tasks based on quorum consensus, and a user configuration, scheduling, and notification application resident on and executable from the digital medium for enabling a user to configure, schedule, and notify team members of a pending quorum event.

In one embodiment, the computing machine is an Internet-connected server and the associated communications devices are smart phones capable of accessing the Internet. In another embodiment, the computing machine is a network-connected personal computer or Laptop computer. In one embodiment, active presence is determined for an individual as an active network connection in session between a communications device associated with the individual and the computing machine. In another embodiment, active presence is determined for an individual as an active network connection in session between a communications device associated with the individual and any network node. In another embodiment, active presence is determined for an individual as an active network connection in session between a communications device associated with the individual and any network node in addition to detection of a specific geo-location for the target communications device.

In one embodiment, votes from quorum members are received pursuant to a pending task after a quorum is confirmed. In this embodiment, votes are further received from non-quorum members pre-authorized to vote when a quorum is present. In a preferred embodiment, the tasks are user-defined and pre-configured and wherein quorum attendance is scheduled ahead of the required task deadline.

According to an aspect of the present invention, a computerized method running on a host computing machine for determining quorum presence on a network and authorizing the transaction of business according to quorum consensus is provided and includes the steps, (a) notifying team members from which a quorum will be determined of a pending quorum event, (b) at the scheduled time of the event, monitoring the connection status of registered communications appliances associated with the team members for presence, (c) quantifying a number of present devices against a required minimum number of present devices qualifying as a quorum according to a rules consultation, (d) confirming or not confirming a quorum as a result of analysis at step (c), and (e) if confirmed a quorum at step (d), authorizing one or more of the found communications devices making up the quorum to transact business.

In one aspect of the method, in step (a), notification is performed by a notification application resident on and executable from a digital medium accessible to an Internet-connected server functioning as the host computing machine and the associated communications devices are smart phones capable of accessing the Internet. In another aspect, in step (a), notification is performed by a notification application resident on and executable from a digital medium accessible to a network-connected personal computer or Laptop computer functioning, as the host computing machine and the associated communications devices are smart phones capable of accessing the Internet.

In a preferred aspect in step (a), the quorum event involves one or more pre-defined tasks requiring a quorum to authorize performance thereof. In a variation of this aspect in step (b), a connection status revealing a communications device of a quorum member connected to the network qualifies as presence of the team member. In another variation of the aspect in step (b), a connection status revealing a communications device of a quorum member connected to a host-computing machine on the network qualifies as presence of the team member. In a further aspect, in step (b), presence determination is further required to confirm a specified or member-shared geo-location for the communications device.

In one aspect of the method, in step (c), rules are pre-configured by subscribers and stored in a repository connected to the host-computing machine. In one aspect, in step (d), the quorum is not confirmed ending the process for that quorum event. In one aspect, in step (e), the authorization involves granting access to one or more centrally stored documents or processes, granting access to a secure transaction process or server, or granting access to proprietary information of a third party. In another aspect, in step (e), the authorization involves distribution of protected information from the server to the team members' devices making up the quorum.

BRIEF DESCRIPTION OF THE DRAWING FIGURES

DETAILED DESCRIPTION

The inventors provide a unique system for remotely determining a quorum and authorizing the quorum to transact business according to quorum consensus. The present invention will be described in enabling detail using the following examples, which may describe more than one relevant embodiment falling within the scope of the present invention.

Figure 1:
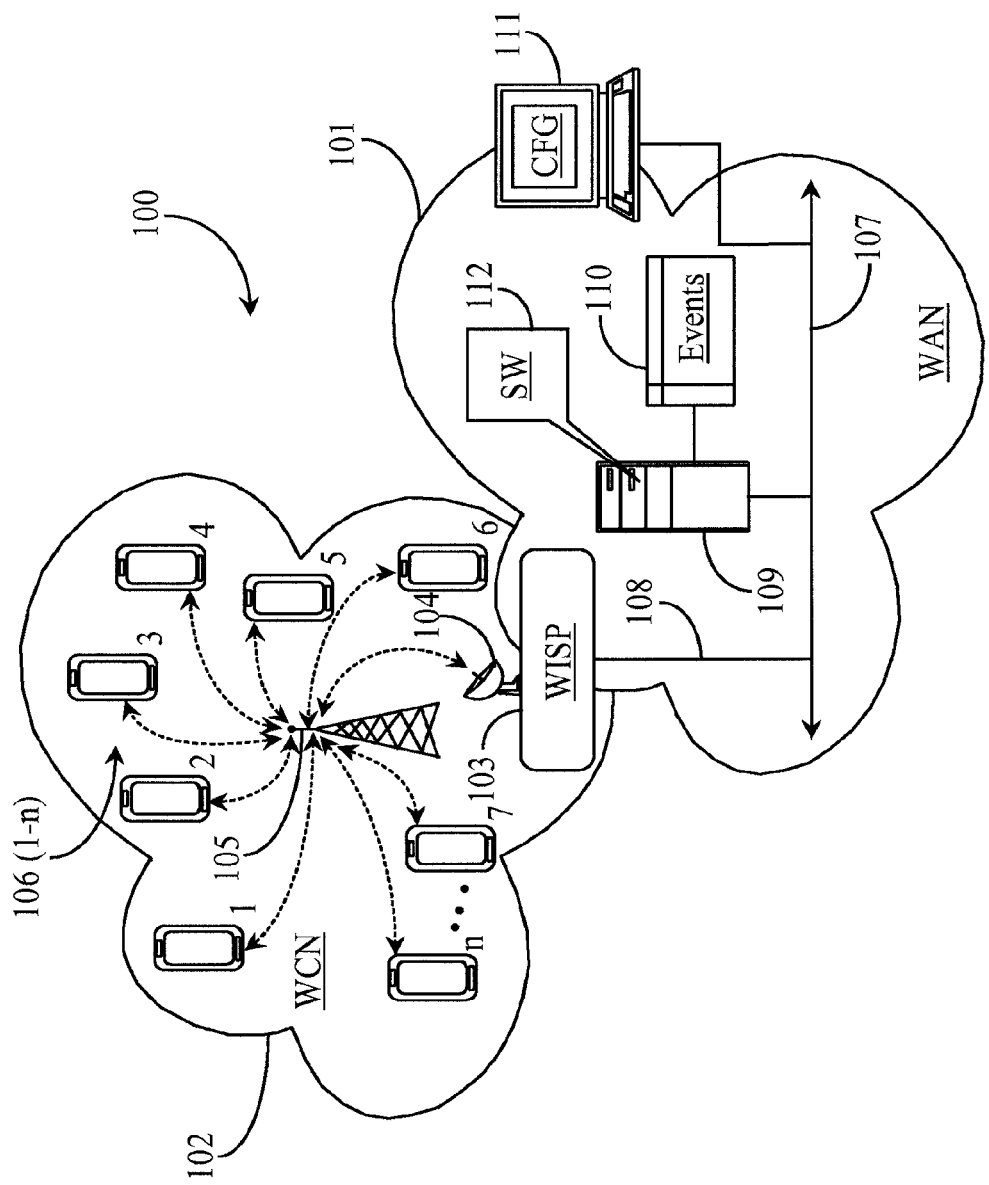
FIG. 1 is an architectural overview of a communications network supporting remote presence enabled quorum management according to an embodiment of the present invention.

FIG. 1 is an architectural overview of a communications network 100 supporting remote presence-enabled quorum management according to an embodiment of the present invention. Communications network 100 includes a wide-area-network (WAN) 101, and a wireless carrier network (WCN) 102. WAN 101 may be a public or private WAN without departing from the spirit and scope of the present invention. In one embodiment WAN 101 is the Internet network and may be referred to hereinafter as Internet 101. The inventors choose the Internet network as a preferred example of WAN 101 because of its high public-access characteristic.

WCN 102 may be any wireless digital network without departing from the spirit and scope of the present invention. WCN 102 may be controlled by one or more telephony operators and may carry both telephone services and Internet access services without departing from the spirit and scope of the invention. WCN 102 may be a private network or a public network. The inventors choose a public network as a preferred example because of a high public-access characteristic.

Internet 101 is further represented by an Internet backbone 107. Internet backbone 107 represents all of the lines equipment and access points for the Internet network as a whole. Therefore, there are no geographic limitations to the practice of the present invention. A quorum management server 109 is illustrated in this example and is connected to backbone 107. Quorum management server 109 includes a digital medium (not illustrated) that contains all of the software and data required to enable function as a remote quorum management server.

Server 109 is adapted with the aid of SW 112 to determine a quorum from a plurality of connected communications devices 106 (1-$n$), which may be smart telephones in one embodiment of the present invention. A quorum represents the minimum number of individuals belonging to a board or other high-level team. Communications devices 106 (1-$n$) are illustrated as connected to a cell tower 105 for wireless communication to one another and for facilitating Internet access to backbone 107 through a wireless transceiver 104 and a wireless Internet service provider (WISP) 103 connected to backbone 107 via a high-speed Internet access line 108.

A user operating a Laptop computer 111 represents an authorized member of a board or team such as a deputy that has administrative access to server 109 for the purpose of subscribing to and configuring the service of the present invention. Operator 111 has an instance of configuration software (CFG) illustrated on the laptop screen. The configuration interface is part of SW 112 and displayed on Laptop 111 as a result of access to server 109. Access to server 109 may be made from a Website (not illustrated). Server 109 is connected to a data repository 110 labeled events. Events represent quorum events that have been configured for notification by subscribers to the service of the present invention. Presence based quorum authorization (PQA) can also comprise Voting based quorum authorization (VQA) without departing from the spirit and scope of the present invention. In voting based quorum authorization a minimum pre-set number of authorization authorities needs to be present while all or a predefined percentage of all authorities shall authorize at least by voting. The members of a presence based quorum authorization for a given resource constitute the presence based quorum authorization resource owners (PQA-RO).

The PQA profile may be associated with the PQA protected resource and could be either stored together with the resource by a PQA resource server or could be managed and stored by a PQA authorization server while maintaining a reference to the corresponding resource. In this example it is assumed that the resources are stored with the quorum task events waiting for service.

The quorum service is a service that allows users to initiate and distribute quorum events to authorized individuals from which a quorum will be identified. A quorum event shall refer to any event in which a quorum is required in order to successfully process the event based on the consensus of such a quorum. In a preferred embodiment, a dedicated presence based quorum authorization service (PQ-AS) is used to control access to the presence based quorum protected resource.

Server 109 enables the service to be practiced remotely over the Internet network 101 and wireless carrier network 102. In one embodiment server 109 logically represents a presence based quorum authorization resource service (PQA-RS), which interacts with PQ-AS for granting access to perform requested operations on the resource. An example of an event or task that would require a quorum of individuals to either be part of a process or to approve specific processing of the event might be a contract management service where a contract may only be opened for editing or revision if a quorum of individuals such as a board or management team is available to control the outcome of the process. A quorum may be required to access certain high-level documents, to perform certain high-level tasks or processes, or to have certain high-level communications or negotiations such as, for example, requiring a quorum of specified invitees to be present to authorize high-level conference call.

Repository 110 may also contain client information, subscriber status, billing data, and other information required to conduct a service business over a network. SW 112 includes at least a configuration interface (CFG) shown on Laptop 111, a notification application, a presence monitoring application, and a determination process for determining whether a quorum of individuals can be identified as present in time for approving processing of events in the system. More detail about the basic components of software 112 will be provided later in this specification.

In a preferred embodiment of the present invention, a business or entity subscribes to the service of the present invention. An authorized user operating a computing appliance like Laptop 111 and with the aid of the configuration interface creates quorum events and schedules notification of the event to a pre-selected body of individuals of which a quorum must be present to process the quorum event. Created events are stored in repository 110 and SW 112 has a notification application for sending out the notifications to the pre-selected body of individuals represented herein by smart phones 106 (1-n).

Before the scheduled time of the event, a period of time set by the authorized user, the smart phones receive notification that their presence is required to process the event. There are 7 smart phones in this example and a quorum thereof might be defined as five authorized persons present in time, meaning that they are all present at the same period of time to give consensus about how to process the event. In some cases, an event may be an ongoing task that must be performed with at least a quorum of pre-selected individuals. In other cases the events are one-time events, repeating events, or periodically occurring events that require some decision about processing before they are unlocked or decrypted for processing.

SW 112 has a monitoring application that monitors the network status of smart phone devices 106 (1-n) for indication of presence on the network and in some cases, indication of occupation of a specifically defined geo-location such as a smart phone in the physical presence of the other smart phones at a same location where a quorum of those relative to the larger body and as defined in created rules for that subscriber can be established at server 109. In one embodiment the monitoring application requires a server connection be established between a designated smart phone and server 109 in order to be classed as present as part of a quorum. In other embodiments the smart phones merely have to be connected online to be considered present, but must be reachable for communication to elicit consensus from the assembled quorum.

In one embodiment, the quorum members shall have a presence based quorum authorization profile. The specifics of a given presence based quorum subject to authorization shall be defined in a presence based authorization profile, which may change over time. Such changes may occur automatically or may occur based on decisions of the PQA-RO. There might be several predefined PQA profiles, and when a PQA resource is created it will be associated by SW 112 with an appropriate PQA profile.

The PQA profile may include certain characteristics such as the type and quantity of presence required for authorization to access a resource. The profile might include geo location requirements such as specifying the same geo-location for all; virtual presence for all; or something in between like a certain number or percentage (or accumulative weight) of physical presence plus minimum weight of overall presence and so on. Many different combinations may be created. If voting is allowed, the PQA profile may include specifics of a VQA associated with given PQA if applicable.

A PQA profile may include a personal profile of individual PQA members, including their rank and weight, required presence type, permission to delegate, and so on. A PQA profile may include a policy for a deputy such as rules for admission of deputies, deputy approval, deputy rank/weight, and presence type if different from other members. A PQA profile may indicate strength of authentication and authorization of PQA actors, for example, which technical methods may be accepted to prove virtual or physical presence, whether strong authentication is required, etc.

A PQA profile might include a list of permitted operations on PQA resources such as creation, read, change, and delete. Status might be reported like resource status such as draft and approved. There might be more than one level of approval or authorization for completing different operations. A PQA profile might list one or more third-party presence based authorization services or presence based authorization resource services. In one embodiment a time restriction or a time window might be enforced relative to duration of attempting to establish the required presence quorum, preferred sequence of checking to determine if a quorum is present, and so on.

In one embodiment there may be one or more automatic operations in case of unsuccessful presence based quorum authorization attempt, for example sending of notifications to all or some of the presence based quorum resource owners. In one embodiment any changes made to a PQA profile require presence based quorum authorization at a specified level or weighting. In one embodiment, a PQA profile change may occur automatically based on some change in status like the age or other status of the PQA protected resource.

Once a quorum is determined and a consensus of the quorum relative to processing an event is established, the server 109 may unlock the event for processing by a designated individual present in time or by more than one individual present in time. In one embodiment if the event relates to one or more documents, it may be that one or more documents is distributed to one or more or all of the members of the quorum for review and consensus. Such consensus may be solicited from the quorum by electronic communications methods such as instant message application, short message services, or some other unified communications application including telephony application such as Voice over Internet Protocol (VoIP). In one embodiment events are scheduled with a frequency that keeps a quorum of individuals busy working and may replace a requirement of having all of these individuals physically present in an office.

Figure 2:
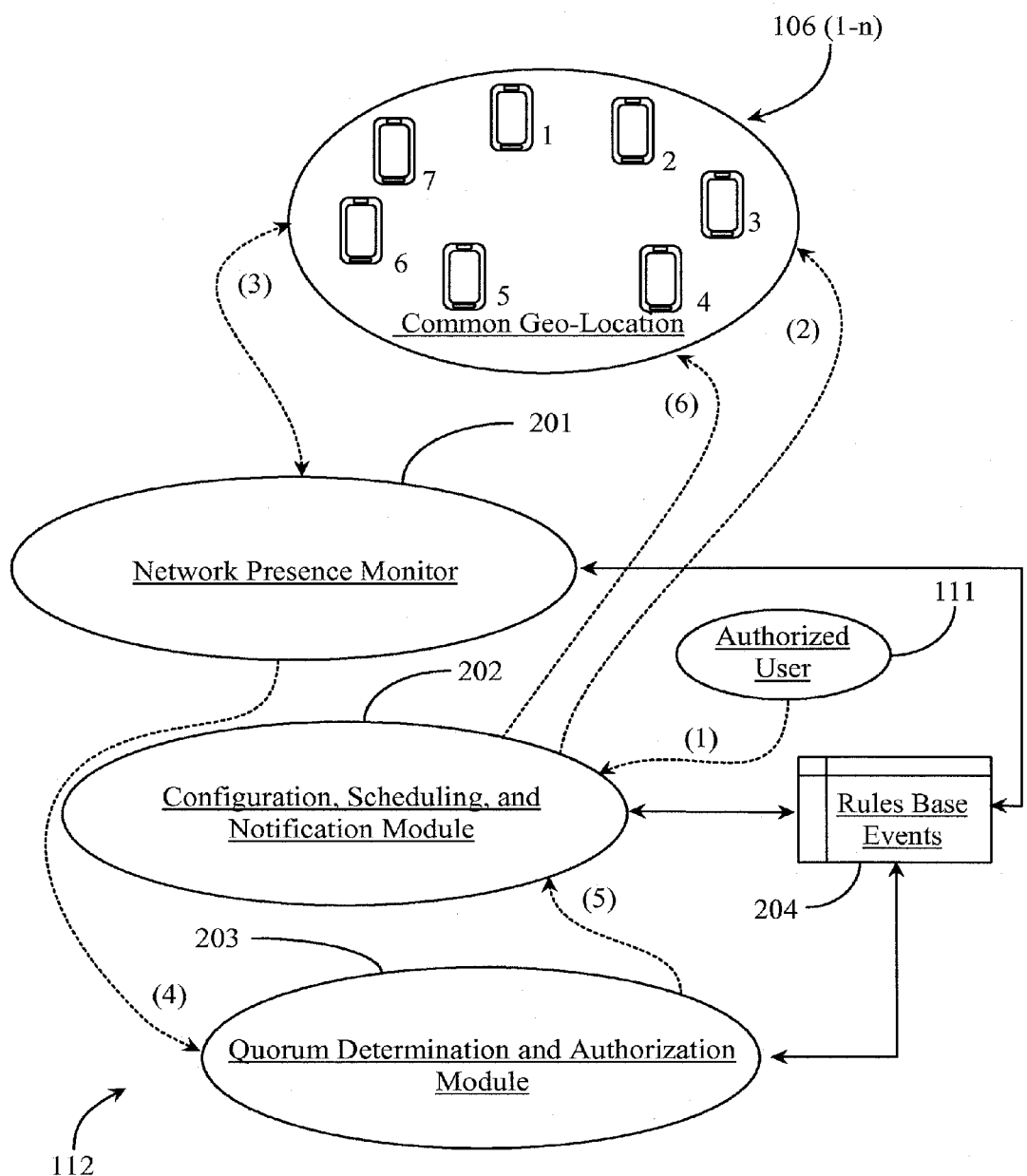
FIG. 2 is a block diagram illustrating functionality of the basic components of the software (SW) of FIG. 1 in remote quorum management.

FIG. 2 is a block diagram illustrating functionality of the basic components of the SW of FIG. 1 in remote quorum management. In this example, software 112 of FIG. 1 includes three basic software components that can reside on and be executed from a digital medium on demand. These components include a network presence monitor 201, a configuration scheduling and notification module 202, and a quorum determination and authorization module 203. Communications devices 106 (1-n) are represented by icons. The aspect of a quorum assumes presence of a person, and in this description it is assumed that the person is associated with and using the device 106. Security in that association may, of course, be enhanced by log-in procedures and other methods known in the art.

An authorized user or deputy 111, analogous to Laptop 111 of FIG. 1, accesses at step (1) SW 112, more particularly configuration, scheduling, and notification module 202 from the server to configure and schedule one or more events requiring a quorum of body 106 (1-n) to be present in time to process the one or more events. In this process, user 111 may create one or more rules for latter consultation. Rules are stored in repository 204 along with configured events. Once an event is configured and scheduled and residing in repository 204, the notification application of module 202 sends notification of the pending event to body 106 (1-n). An authorized user or deputy charged with configuring and scheduling events may set a notification window of some arbitrary time period.

Once notifications have been set for an event, network presence monitor 201 begins monitoring for presence of individuals of the body 106 (1-n) at step (3). Presence parameters may vary according to rules set by an authorized user such as user 111. In one embodiment presence is defined simply as device online. In another embodiment presence is defined as device online and in a specified geo-location with other devices. In one embodiment, paring of devices using Bluetooth™ or some short-range wireless technology is required to establish geo-location. In another example, global positioning satellite (GPS) reporting is used to determine the geo-location of the communications devices 106 (1-n).

Presence monitor 201 reports presence monitor findings to quorum determination and authorization module 203 at step (4) so that that module may make a determination of quorum against a set of rules and if finding a quorum authorizing event processing by the quorum or a deputy thereof or by other designated individuals or third-party entities. Module 203 determines a quorum is established of five out of seven communications devices. Communications devices 2 and 6 were not considered present in time in this example. However, devices 1, 3, 4, 5, and 7 are deemed present in time and are subsequently authorized as a quorum for event processing at step (5) with module 203 leveraging module 202 to notify the quorum at step (6).

One authorized, the quorum of individuals may be in full communication with the server and event processing may occur based on the consensus of the quorum. Event processing may vary according to event type, business type, and rules for event processing configured into the system by a subscriber. An event may be a transaction that must be approved by a quorum before processing. An event may be a task or process hosted by a third-party service or system that cannot be accessed unless a quorum is present in time. There are many different possibilities and event processing range from a simple consensus to ongoing involvement by all of the quorum participants during the performance of a task or oversight of a process. It is noted herein that at least the contact data for all of the potential quorum individuals is known to the system for notification and authorization purposes. In one embodiment tighter security regimens are observed such as password protection encryption and insuring that the operator of any communications device is a human operator.

Figure 3:
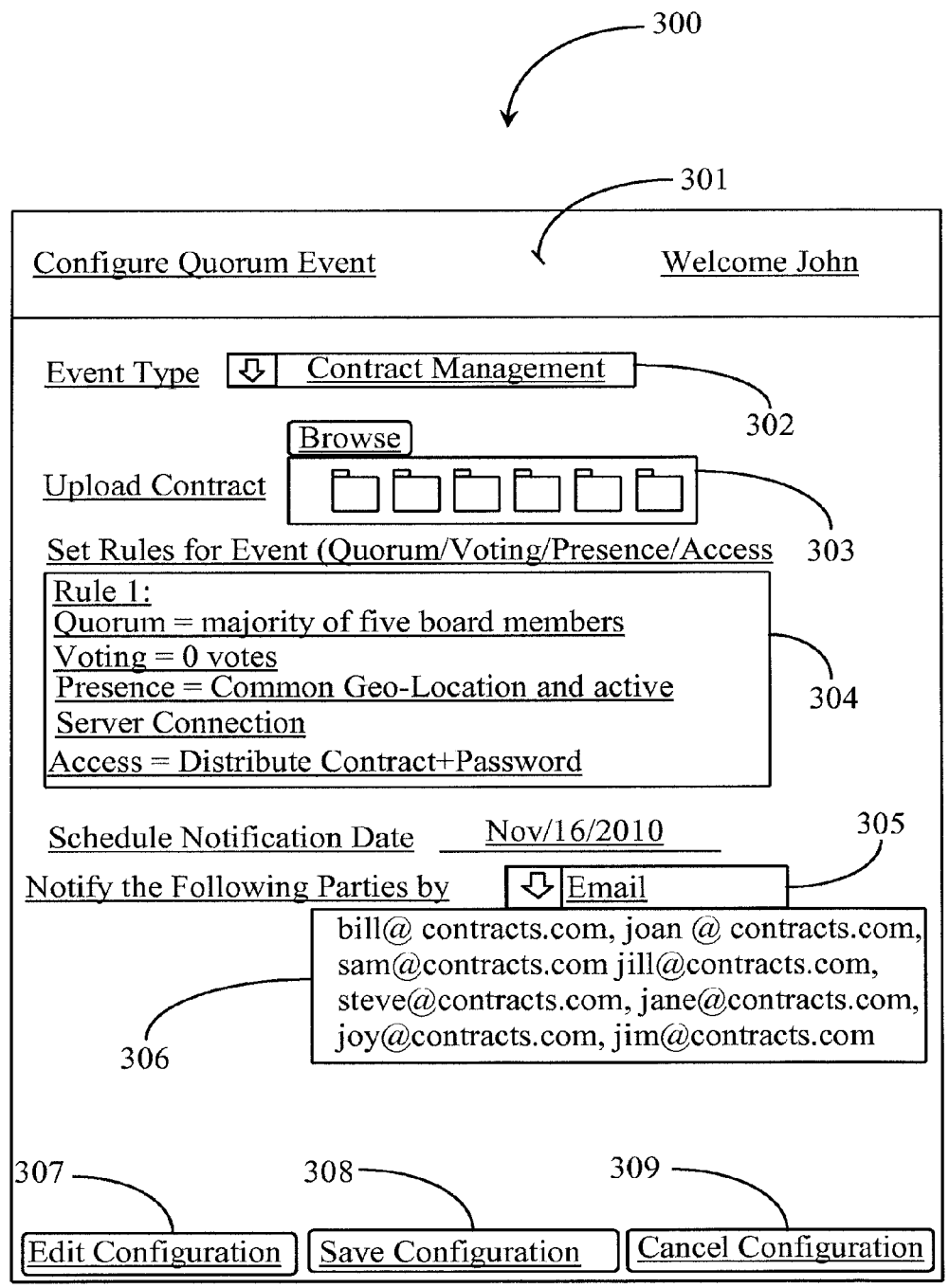
FIG. 3 is an exemplary screen shot of a configuration interface of the SW of FIG. 1 according to an embodiment of the present invention.

FIG. 3 is an exemplary screenshot 300 of a configuration interface of SW 112 of FIG. 1 according to an embodiment of the present invention. Screenshot 300 is an exemplary screenshot of a configuration interface operated by an authorized user to configure and schedule quorum-dependent events. Screenshot 300 has a title bar 301 identifying the interface as an interface for configuring a quorum event. Screenshot 300 includes a personal welcome statement to the accessing user.

Screenshot 300 might be accessed as an electronic form or e-form accessible through a service Website without departing from the spirit and scope of the present invention. Event configuration and processing may be browser-based activity enabled though a Website. A dropdown menu interface 302 is provided in form 300 for a user to configure an event type. In this example, the event type is listed as contract management. In the case of the event type being one of a contract management event, a next user interface 303 may be one for uploading the contract into the system if not already done. Upload interface 303 includes a browsing window or menu enabling the user to browse his or her computing appliance for a contract to upload for quorum-based processing.

Screenshot 300 includes a rules interface 304 for enabling the user to set rules for quorum determination and event processing. A rules workspace window is provided for the user to enter one or more rules for determining a quorum, for regulating voting, for determining presence, and for granting access to content. There may be more or fewer rules categories than are presented in this example without departing from the spirit and scope of the present invention. Moreover, one or more custom rules may also be created. In this example, a rule 1 includes a quorum definition of a majority of five board members; no voting (voting=0 votes); a presence definition indicating a common geo-location with a connection to the host server; and an access procedure of distributing the uploaded contract with a password to the members of the authorized quorum.

Screenshot 300 includes a line for setting a notification date, on which notifications of a pending event are sent to designated individuals from which a quorum will be determined. A notification date is different from an event date. An event may have a deadline after which the event, if not processed is void. The notification sent to team members or body members will contain all of the parameters related to the event including the expiration date of the event if any.

A user may use a dropdown menu 305 to select which type of media to use to notify parties to event processing. In this case, the parties are notified via email. Other media types might be used instead of email such as telephone, instant message, short message services, and other communication methods. Presence may also be determined through a unified messaging application common to all of the participants like yahoo messaging or some other presence enabled application that resides on the client communications devices. An interactive workspace window 306 is provided in screenshot 300 for the user to enter in the contact data for those who will receive notification of a pending event. Notification recipients may be loaded into the system through cutting and pasting of contact data or through importing contact data from another application, and so on. In this case email addresses are listed for each contact. The system will generate automated email notifications to the email addresses.

After populating form 300, the user may select an edit configuration button 307 to edit or modify parts of the populated form. The user has the option to save the current configuration using save button 308. Another option is canceling an existing configuration using cancel button 309. A different configuration may be made for different event types. In one embodiment a single configuration form may cover more than one event type with the same or different treatments. Once the configuration form is saved, the existing configuration is complete and it can be stored for later processing. In one embodiment, a pending event carries a redirection order for the quorum of individuals in case of authorization to a third-party service. There are many possibilities.

Figure 4:
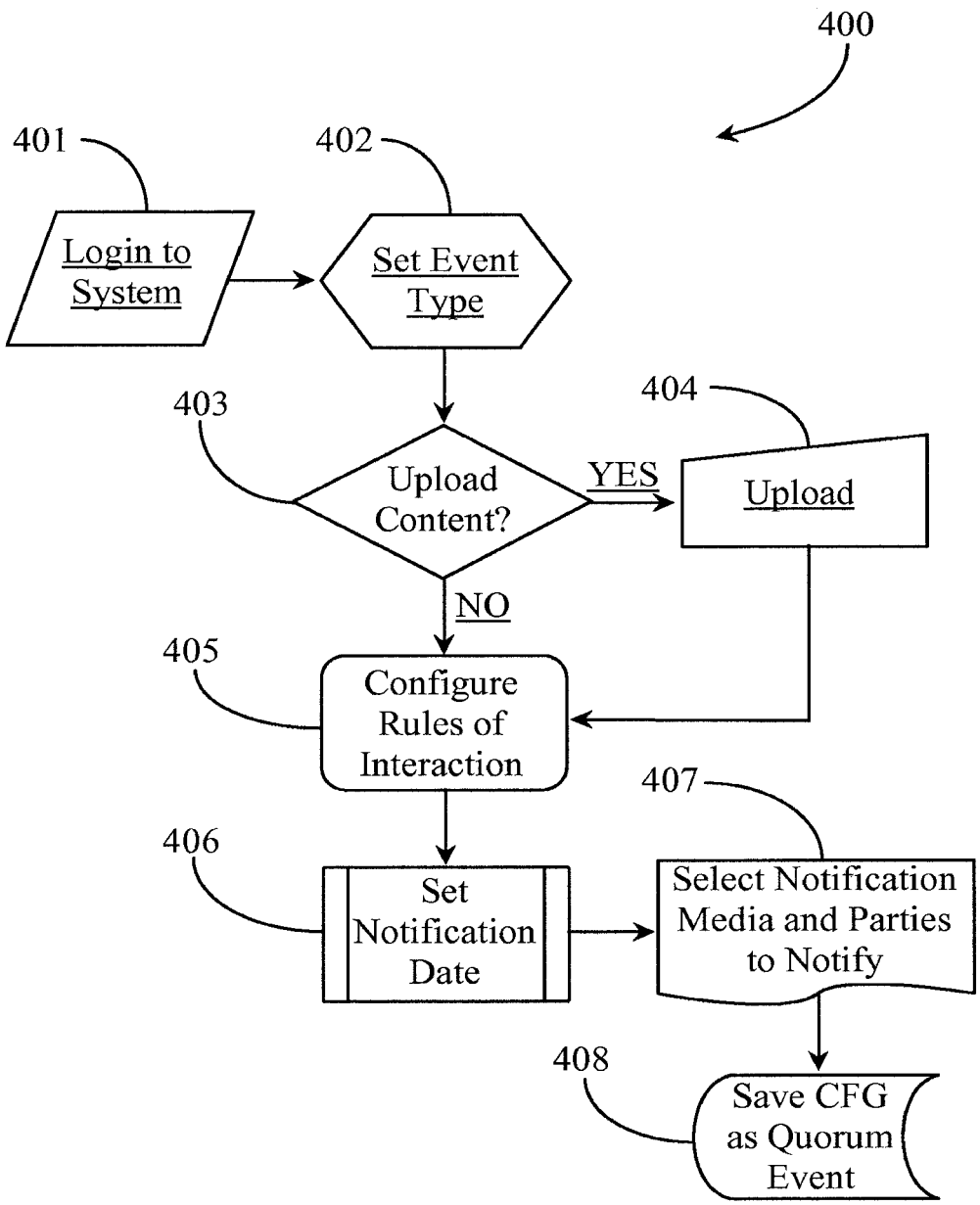
FIG. 4 is a process flow chart illustrating steps for configuring a quorum event according to an embodiment of the present invention.

FIG. 4 is a process flow chart 400 illustrating steps for configuring a quorum event according to an embodiment of the present invention. At step 401 it is assumed that the user configuration interface appears as an e-form or other browser-based form. At step 402 the user may set the event type. An event type might be a transaction, a task, a process, or activity.

At step 403 the user decides whether or not to upload content to the service for reference or for redistribution. If at step 403 the user determines to upload content, then the process moves over to step 404 and content is uploaded to the system's server by the user. It may be determined at step 403 that no content will be uploaded. In case of uploaded content or no, the process resolves to step 405 for configuring the rules of interaction. In general rules shall follow a simple model including quorum rules, voting rules, presence rules, and access rules.

Once the rules are set for interaction, the user sets a notification data to notify the body of the pending event. It is not required that an event be scheduled in order to practice the present invention, however many events have time constraints such as deadlines that have to be contended with. All events will have notification dates associated with them for automatically notifying parties to the presence of the upcoming event for processing. The user sets a notification date for an event at step 406. A suitable notification time window within which the recipient should respond to the notification depends at least in part on event type. For a transaction requiring a quorum to approve, the time window may be relatively short compared say with a time window for a more complicated process such as formalizing a document for distribution.

Once notification date is set, the user may select the desired notification media such as (instant message) for example, and may enter or upload the addresses to enable notification of the parties. After the configuration is complete for one or more events, the user may save the configuration in a repository for latter service as a pending quorum event.

Figure 5:
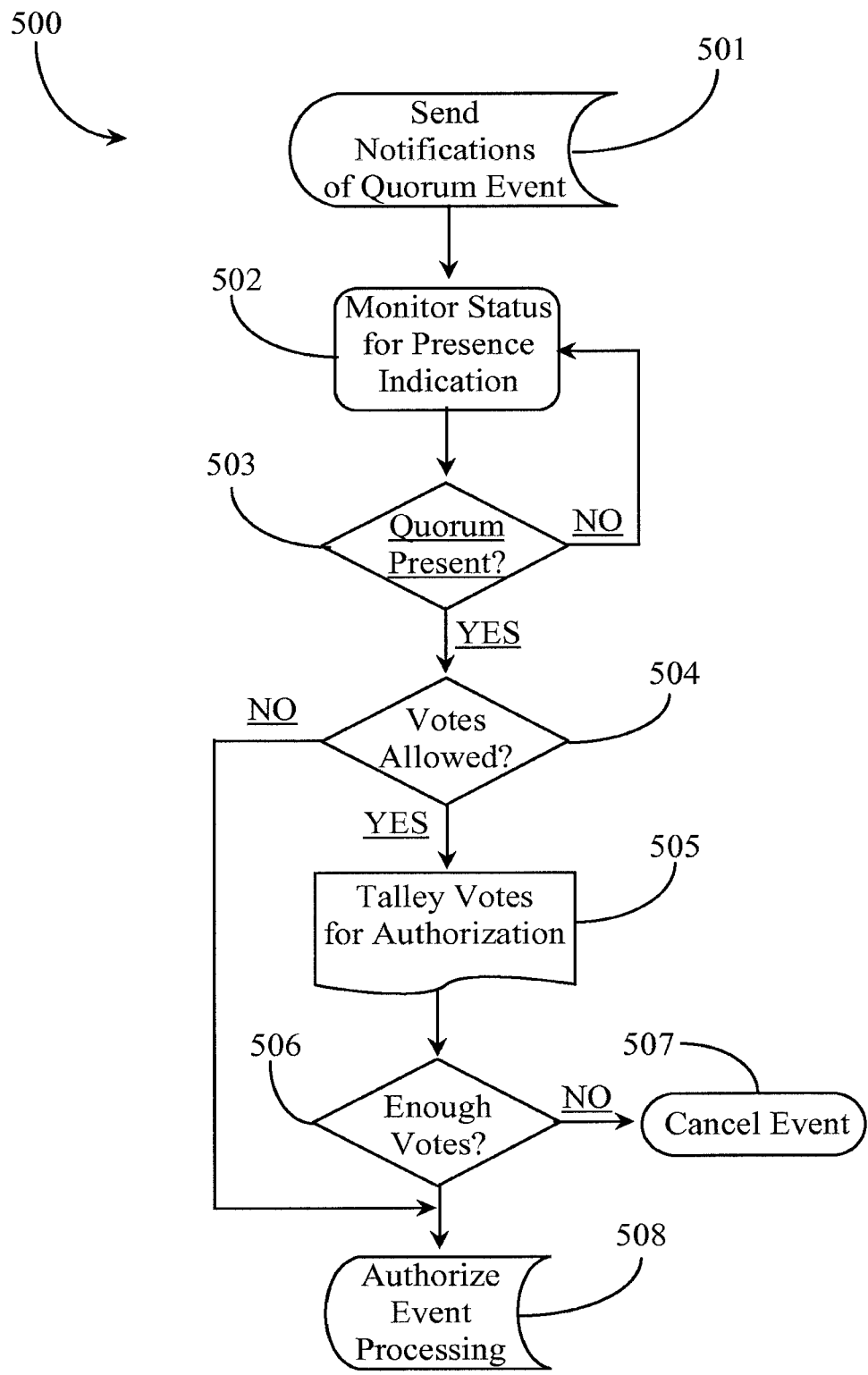
FIG. 5 is a process flow chart illustrating steps for determining a quorum and authorizing event processing according to an embodiment of the present invention.

FIG. 5 is a process flow chart 500 illustrating steps for determining a quorum and authorizing event processing according to an embodiment of the present invention. At step 501, the notification date for an event arises and the system sends a notification event to all of the designated parties. At step 502, the system leveraging a presence monitoring application monitors status of the communication devices that received notification for online or special presence indication.

At step 503, the system makes a determination if a quorum is present against a set of rules. At step 503, if no quorum is present, the process may resolve back to step 502 for further monitoring. In one aspect, if monitoring for presence is conducted past a certain period, then the event may be canceled if no quorum can be determined within the allowed time window. At step 503, if the system identifies a quorum, the system may make further determination if voting is or is not allowed.

At step 504, if the system determines that there is no voting, the process may skip to step 508 where the system may authorize event processing based solely on the presence of a quorum. If the system determines that voting is allowed at step 504, then at step 505, the system may enable voting and may tally votes cast as a pre-condition for event processing authorization. In the case of the system enabling voting, at step 506 the system may determine if there are enough votes to authorize processing of an event. If the system determines that there are not enough votes cast by the quorum and any other allowed voters, then the system may cancel the event at step 507 and may not allow access or event processing. If the system determines that there are enough votes received from the quorum and any other allowed voters, the system may authorize event processing at step 508.

In one embodiment of the invention authorization of a quorum to process events is the last step by the system and service leaving event processing entirely up to the quorum or pre-designated user to process the events. In another embodiment the system may redirect an authorized quorum to a third-party service to aid in event processing such as a banking service for distributing funds or the like. There are many different possibilities.

Authorization over a particular resource may carry aspects such as permission and ability to create, maintenance of private copies, encryption and or personal authentication of those copies, distribution policies, and so on. While actors associated with a PQA service are usually persons there could be also specific scenarios where access to a specific live service may be granted in addition to PQA-RS and PQ-AS as these servers typically need to be operational in order for an operation on a PQA controlled resource to be completed. An example could be the availability of a secure protected access service to the PQA-RS for all actors, or a service that exposes access to another PQA controlled resource, for example, in a case of conditional PQA controlled operations on resource A, there might be a dependence on status or attributes of PQA operations to be performed on resource B.

Figure 6:
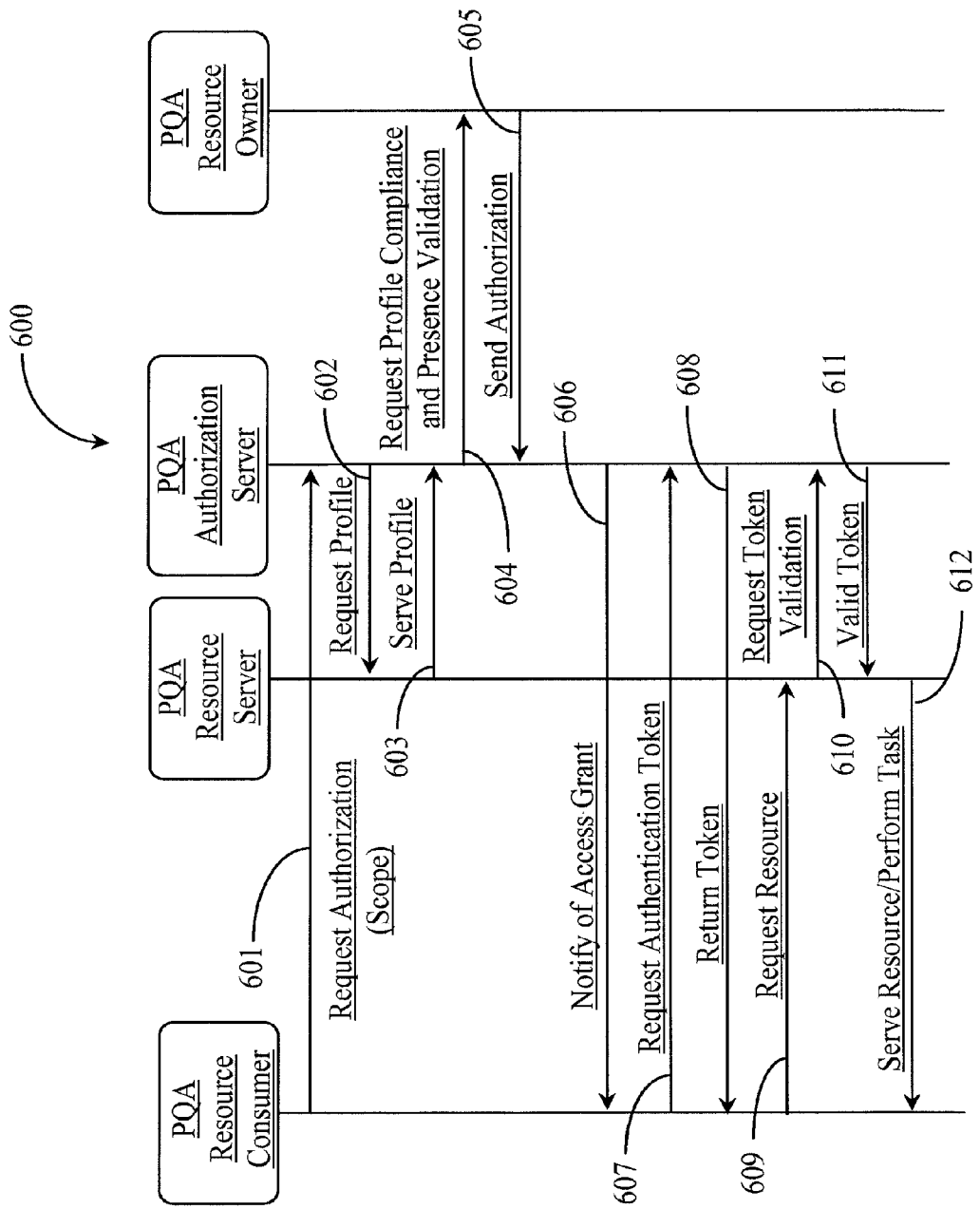
FIG. 6 is a united modeling diagram 600 illustrating a presence-enabled quorum authorization service according to a variation of the embodiment described in FIG. 1.

FIG. 6 is a united modeling diagram 600 illustrating a presence-enabled quorum authorization service according to a variation of the embodiment described in FIG. 1. As previously described above, a presence-based quorum authorization service may require several points of authentication or validation in the path of interaction. Diagram 600 represents such interaction that may occur relative to the process of authorizing a quorum to have access to one or more resources.

A PQA resource consumer may send a request for authorization to a presence-based quorum authorization server at step 601. The server may, in turn, request the PQA profile from the PQA resource server at step 602. The profile served at step 603 will specify all of the requirements for affecting access to the resources. The authorization server will request profile compliance and presence validation from a PQA resource owner at step 604, which in one embodiment authorizes the quorum and vets all requirements. The resource owner may send authorization to the PQA authorization server at step 605.

At step 606, the PQA server sends notification to the PQA resource consumer of access grant status. After receiving a notice of authorization, PQA resource consumers may require yet additional security means to actually make any resource modifications. For example, after receiving a notification granting access to resources, the resource consuming entity or body may be required to request an authentication token from the PQA authorization server at step 607. The PQA authorization server may send a token to the consumer at step 608. The consumer may request access using the provided security token at step 609. The resource server may require further validation of the presented token at step 608. At step 611, the authorization server validates the token and at step 612, the resource server serves or otherwise makes available, the resource or resources that were subject to the authorized release or access. In this example, there are four points of validation, profile validation, quorum and presence validation, consumer authorization, and token verification.

In one embodiment, the PQA resource owner would access and perform operations on the resource directly. However, there might be also scenarios where the actual operations are performed by a third party referred to as a PQA Resource Consumer (PQA-RC) after being authorized by the PQA resource owner. The right to perform certain operations on the resource can be specified in an access grant, and for individual operations under a given access grant the PQA-resource consumer can acquire an access token from the PQA-resource owner. Both the access grant (notification and state) and access token may have an associated expiration date.

Generally speaking consumer access to the resource is logically a request of the whole PQA consumer community (which could coincide with the PQA Resource Owner community), but there might be different implementations:

In one case the presence quorum is validated through a trusted collaborative PQA client application that is interacting with PQA members' presence devices/tools such as a smart phone and/or Unified Communication service; and after success the PQA client application interacts with PQA Authorization Server and/or PQA Resource Server.

In a second case the presence quorum is validated directly by the PQA Authorization Server which is interacting with all PQA members' PQA enabled devices/tools.

In general the PQA needs to be re-validated each time the PQA Resource is being accessed, but there might be deviations specified in the PQA policy.

In some embodiments there may be implementation of a PQA Session. After opening a PQA Session—either scheduled or ad-hoc—there might be a predefined PQA validation time window of a fixed time length—which could be part of the PQA Profile. If a necessary quorum of PQA members can't be established within the PQA validation time interval then the PQA session would be aborted and the PQA members would be notified. The PQA policy might also require re-validation of the quorum after certain time intervals in order to make sure that the PQA presence status is preserved for the duration of the session. Again, there might be deviations specified in the PQA profile.

In another embodiment there may be implementation of a PQA Personal Agent, an instance of which is associated with each PQA community member. The PQA Personal Agent might be peered (in a secure way) with end devices such as GPS enabled smart phones or other future GPS enabled smart devices, such as enhanced navigation system within a car, or it could be peered with a real-time communication service such as Unified Communication. When activating the PQA Personal Agent it will first authenticate the owner through appropriate means (name/password, or biometrical, or multifactor, etc.), and after success it will interact with the PQA Authorization service. The PQA Personal Agent might also require periodic re-authentication of the owner.

It will be apparent to one with skill in the art that the event processing authorization system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A computerized method running on a host computing machine for determining quorum presence on a network and authorizing a business transaction according to quorum consensus, the method comprising:
   receiving, by a processor, information regarding a quorum event, the information comprising a notification criteria and a plurality of recipient addresses;
   monitoring, by the processor, whether or not the notification criteria is satisfied;
   transmitting, by the processor, a notification message to the plurality of recipient addresses of the quorum event in response to the notification criteria being satisfied;
   monitoring, by the processor, a quorum event engagement status of communication devices corresponding to the recipient addresses to determine whether or not a number of the communication devices that are engaged with the quorum event exceeds a preset minimum number; and
   authorizing, by the processor, one of the communication devices to transact business in response to determining that the number of the communication devices that are engaged with the quorum event exceeds the preset minimum number.

2. The method of claim 1, wherein the notification criteria comprises a notification time.

3. The method of claim 1, wherein the quorum event comprises a pre-defined task requiring the quorum is present to authorize performance thereof.

4. The method of claim 1, wherein the monitoring of the quorum event engagement status of the communication devices comprises determining whether or not the communication devices are connected to a cellular network.

5. The method of claim 1, wherein the monitoring of the quorum event engagement status of the communication devices comprises determining whether or not the communication devices are in a specific geo-location.

6. The method of claim 1, wherein the communication devices that are engaged with the quorum event are connected to a quorum management server.

7. The method of claim 1, the method further comprising not authorizing, by the processor, any of the communication devices to transact business based on the quorum not being present.

8. The method of claim 1, wherein authorizing the communication device to transact business comprises granting, by the processor, access for the communication device to an electronically stored document.

9. The method of claim 1, wherein authorizing the communication device to transact business based on the quorum being present further comprises granting, by the processor, access for the communication device to protected information.

10. The method of claim 1, wherein at least one of the communication devices comprises a mobile telephone.

11. A system for determining presence of and authorizing a quorum to transact business over a network, the system comprising:
    a processor; and
    a memory coupled to the processor, wherein the memory stores instructions that, when executed by the processor, cause the processor to:

receive information regarding a quorum event, the information comprising a notification criteria and a plurality of recipient addresses;

monitor whether or not the notification criteria is satisfied;

transmit a notification message to the plurality of recipient addresses of the quorum event in response to the notification criteria being satisfied;

monitor a quorum event engagement status of communication devices corresponding to the recipient addresses to determine whether or not a number of the communication devices that are engaged with the quorum event exceeds a preset minimum number; and authorize one of the communication devices to transact business in response to determining that the number of the communication devices that are engaged with the quorum event exceeds the preset minimum number.

12. The system of claim 11, wherein the notification criteria comprises a notification time.

13. The system of claim 11, wherein the quorum event comprises a pre-defined task requiring the quorum is present to authorize performance thereof.

14. The system of claim 11, wherein the monitoring of the quorum event engagement status of the communication devices comprises determining whether or not the communication devices are connected to a cellular network.

15. The system of claim 11, wherein the monitoring of the quorum event engagement status of the communication devices comprises determining whether or not the communication devices are in a specific geo-location.

16. The system of claim 11, wherein the communication devices that are engaged with the quorum event are connected to a quorum management server.

17. The system of claim 11, wherein the instructions further cause the processor to not authorize any of the communication devices to transact business based on the quorum not being present.

18. The system of claim 1, wherein authorizing the communication device to transact business comprises granting, by the processor, access for the communication device to an electronically stored document.

19. The system of claim 11, wherein authorizing the communication device to transact business based on the quorum being present further comprises granting, by the processor, access for the communication device to protected information.

20. The system of claim 11, wherein at least one of the communication devices comprises a mobile telephone.

* * * * *